June 16, 1959 J. H. PORTER 2,890,644
HOT FOOD PACKAGE VENDING MACHINE
Filed July 31, 1958 2 Sheets-Sheet 1

INVENTOR
JOHN H. PORTER
BY Byerly, Townsend,
Watson & Churchill
ATTORNEYS.

June 16, 1959 J. H. PORTER 2,890,644
HOT FOOD PACKAGE VENDING MACHINE
Filed July 31, 1958 2 Sheets-Sheet 2
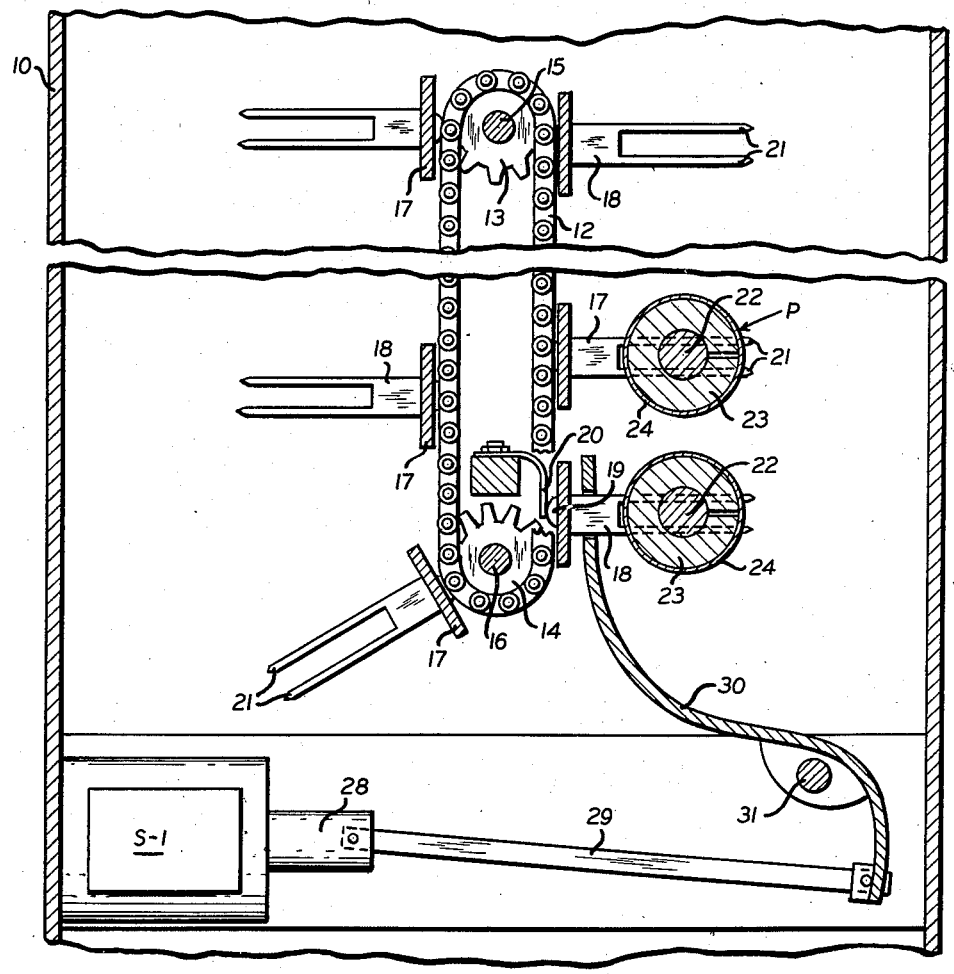
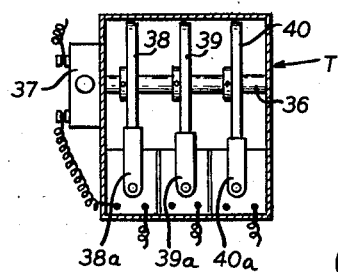
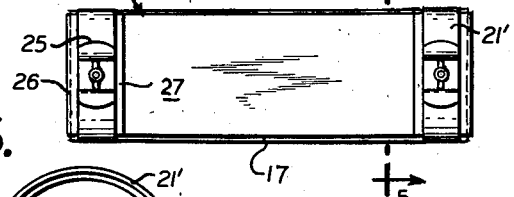
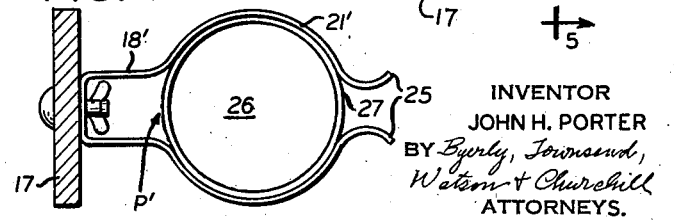
INVENTOR
JOHN H. PORTER
BY Byerly, Townsend,
Watson & Churchill
ATTORNEYS.

United States Patent Office 2,890,644
Patented June 16, 1959

2,890,644
HOT FOOD PACKAGE VENDING MACHINE

John H. Porter, Brooklyn, N.Y.

Application July 31, 1958, Serial No. 752,256

6 Claims. (Cl. 99—327)

The present invention relates to a machine or apparatus for successively heating or cooking and dispensing a packaged food product which must be kept under refrigeration and aims to provide certain improvements in such machines.

Among the objects of the present invention are (a) to provide a refrigeration cabinet within which is mounted an apparatus for heating and dispensing packaged food products; (b) to provide a machine of the type set forth in (a) wherein only a single packaged food product is heated prior to dispensing and hence does not unduly affect or impose a load on the refrigeration mechanism; (c) to provide a machine wherein a packaged food product is subjected successively, in response to a coin operated timing mechanism, to a heating operation, is then discharged from the machine, and another packaged food product is presented in position for a repetition of said operations; and (d) to provide a machine of the character set forth having a conveyor onto which the packaged food products can be conveniently charged for subsequent treatment.

The foregoing and other objects of the invention, not specifically enumerated, are accomplished by enclosing within a refrigeration cabinet, a chain conveyor having a plurality of sets of pairs of spaced electrodes adapted to support individual food product packages and to convey them to a station whereat when a coin is deposited into the machine, an electric circuit is closed through a timing switch controlling device which in succession, closes the circuit through a pair of electrodes to heat a food product package, then closes a circuit through a mechanism to discharge the heated food product package and then closes a circuit through a motor to operate the conveyor to present a succeeding food product package to the station for repetition of the foregoing steps when another coin is deposited in the machine. The construction of the apparatus and its modus operandi will be readily understood from the detailed description which follows, when considered in connection with the accompanying drawing wherein:

Figure 2 is a vertical section, on a greatly enlarged scale, taken along the line 2—2 of Figure 1.

Figure 4 is a front elevation of a modified form of supporting means and a packaged food product to be heated and dispensed by the apparatus.

Figure 5 is a section taken on the line 5—5 of Figure 4.

Figure 7 is an elevation of a master timer with the casing broken away.

Figure 1:
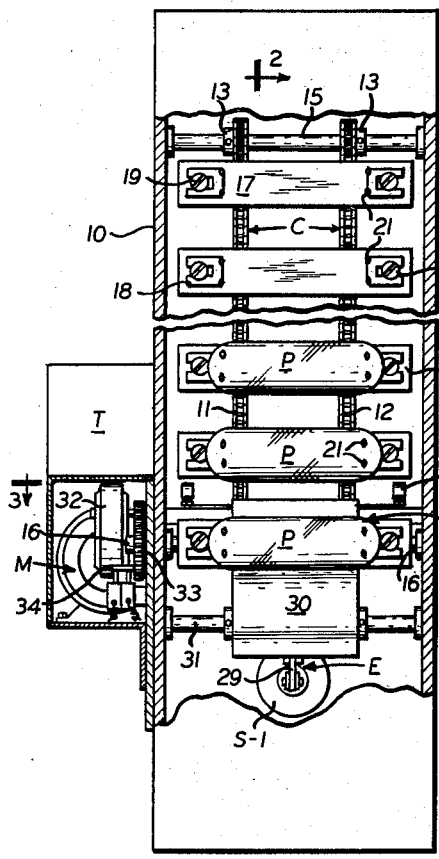
Figure 1 is a front elevation of an apparatus embodying the invention, a portion of the front of the cabinet being broken away to illustrate the mechanism.

Referring to the drawings in the various figures of which the same numerals indicate corresponding parts, C is a conveyor which is driven by an electric motor M to intermittently advance packaged food products P, mounted on the conveyor to a heating or broiling station S for ejection after heating by an ejector E, the timing and operation of the various elements being controlled by a timer device T, which may be coin operated.

The conveyor C and ejector E are preferably housed within a refrigeration cabinet 10, to preserve the packaged food products P until such time that they are to be heated and dispensed from the cabinet. The conveyor C preferably consists of a pair of endless chain link belts 11 and 12, trained over pairs of sprocket wheels 13, 14 mounted on a pair of shafts 15, 16 which are mounted in suitable bearings within the cabinet 10. Mounted on the chain link belts in equally spaced relation are insulated supports 17, each carrying a pair of conducting brackets 18 having metallic projecting heads 19 adapted to make electrical contact with spring biased contacting elements 20, at the heating or broiling station S.

Figure 3:
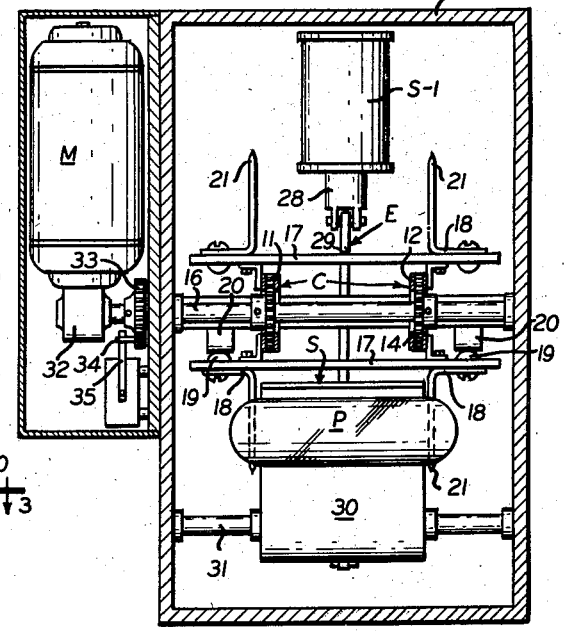
Figure 3 is a horizontal section, on an enlarged scale, taken along the line 3—3 of Figure 1.

As shown in Figures 1 to 3 the conducting brackets 18 which may be fixedly or removably mounted on the supports 17 are each formed with a pair of prongs 21 upon which may be impaled a packaged food product, such as a frankfurter 22 inserted within a split roll 23 and wrapped in a cellophane or analogous wrapping material 24. The packaged frankfurter and roll may also contain an envelope of suitable condiment such as mustard or relish for use with the frankfurter. In Figures 4 and 5 conducting brackets 18' in the form of U-shaped spring clips 21' are shown, the arms of which have arcuate portions and divergent free ends 25 to facilitate introducing and holding within said clips a packaged food product P' in the nature of an insulated container having metallic ends 26, with annular conducting bands 27, for making electrical contact with the clips 21'.

The ejector E consists of a solenoid S-1 having an armature 28 to which is connected one end of a link 29, the other end of which is connected to an ejector lever 30 pivoted on a shaft 31, the free end of the lever 30 being disposed outwardly of the orbit of the link chain belts 11, 12 and between the electrical conducting brackets 18 so that when current is passed through the solenoid S-1 the lever 30 will pivot to disengage the packaged food product P impaled on the prong 21 or the packaged food product P' held within the clips 21' to discharge said food products from the conveyor to a receptacle (not shown) accessible by a vendee from the exterior of the cabinet 10.

The electric motor M through suitable reduction gearing within a housing 32 is adapted to drive a gear 33 mounted on the shaft 16 for intermittently advancing the conveyor C. The gear 33 carries a laterally projecting pin 34 which normally holds open a switch 35 adapted to control the current to the motor under certain conditions hereinafter explained.

Figure 6:
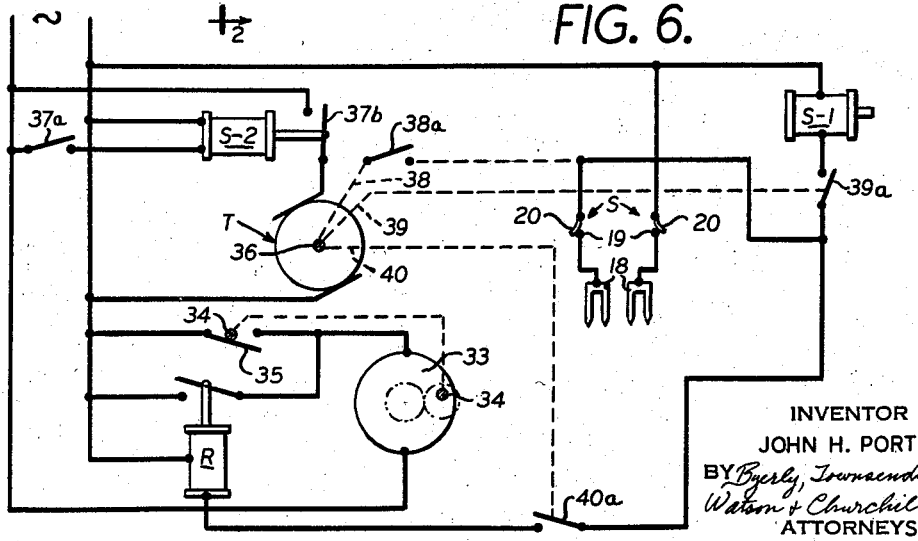
Figure 6 shows a schematic electric wiring diagram for the apparatus.

The timer device T may be of any well known type capable of closing circuits in sequential timed relation and as herein shown consists of a casing having mounted therein a shaft 36 operable by a motor 37, current to which is controlled by a coin operated switch 37a (Fig. 6) the shaft having mounted thereon a plurality of arms 38, 39 and 40 for cooperation respectively with microswitches 38a, 39a and 40a, the motor being adapted upon being activated to rotate the shaft 36 one revolution.

In the operation of the machine, the packaged food products P or P' are charged onto the supports 17 by being either impaled on the prongs 21 of the brackets 18 or snapped into the U-shaped clips 21' of the brackets 18'. This may be done through a door (not shown)

in the cabinet 10. The machine is now ready for heating and dispensing the packaged food products upon depositing a coin or coins into a coin controlled device of any well known type (not shown) associated with the machine or the timer device T.

When a coin is deposited, it closes the switch 37a to a solenoid S-2 which latter operates to close a switch 37b to the timer device motor 37, to rotate the shaft 36 thereof one revolution. The closing of switch 37b first closes the current through arm 38 and microswitch 38a the electrodes 18 and spring clips 20 to heat the packaged food product P. The switch 38a remains closed through one rotation of shaft 36. While the shaft 36 of the timing device in rotating slowly nears the end of its single cycle the arm 39 engages micro-switch 39a to close a circuit through solenoid S-1 to eject the heated packaged food product. The arm 40 then engages and operates micro-switch 40a momentarily to energize through relay R the conveyor motor M which as it rotates gear 33 moves the pin 34 thereon off from switch 35 to permit said normally open switch to close and continue to supply current from the main line to the motor M to advance the conveyor to present the next packaged food product to the heating station S after the timer T has been cut off. When this is accomplished the pin 34 again engages switch 35 to open same, thus stopping the conveyor movement and leaving the machine in condition to receive another coin for repetition of the heating and dispensing of a packaged food product.

It will be understood that the period for heating the packaged food product can be controlled by the timer device T and that the coin controlled mechanism may be of any preferred type. Also that if desired the machine may be duplexed or multiplexed to increase its capacity. In all events very little heat is dissipated during the heating cycle and hence does not impose undue strain on the refrigeration apparatus.

The machine is exceedingly simple in construction and operation and of a character that may be readily charged and cleaned to meet the sanitary codes of different communities.

Although I have shown and described certain preferred embodiments of my invention it is to be understood that changes in details of construction and operation may be made therein within the range of engineering and mechanical skill without departing from the spirit of the invention as hereinafter claimed.

What I claim is:

1. A machine for heating and vending a packaged food product comprising an electric motor, an endless conveyor operable by said motor and having means spaced longitudinally thereon for supporting a plurality of packaged electrical conducting food products, a heating station to which such supported food products are successively presented, said food product supporting means including pairs of spaced electrodes extending outwardly from the orbit of travel of the conveyor and adapted to make electrical contact with the electrical conducting means forming part of the packaged food product; electrical circuitry including contacts at the heating station for engagement with the electrodes for closing the circuit through the packaged food product, electro-operable means adjacent said heating station for ejecting a heated packaged food product from the supporting means, switches for controlling the circuits for operation of the ejector means and the rotation of the motor, and a timer device; said timer device when operated functioning to control the time interval during which the supported packaged food product will be subjected to heating, and then control successively the switches for the operation of the ejector means and the motor to advance the conveyor to present a succeeding packaged food product to the heating station.

2. A machine according to claim 1 wherein the ejector means is operable by a solenoid.

3. A machine according to claim 1 wherein the electrical circuit to the motor includes a secondary switch which is normally open and is adapted to be closed by means associated with the motor during the starting of rotation thereof, the closing of said secondary switch functioning to complete a circuit to the motor for continuing operation thereof to advance the conveyor to present the next succeeding packaged food product to the heating station after the timer operated switch has been opened.

4. A machine according to claim 1 wherein the packaged food product comprises a container having an insulated body and spaced electrical conducting ends, and the electrodes are resilient clips adapted for making electrical contact with the ends of the container.

5. A machine for broiling and vending a packaged frankfurter sandwich comprising an electric motor, an endless conveyor operable by said motor and having pairs of spaced-pronged electrodes longitudinally spaced along the conveyor and upon each pair of electrodes is adapted to be impaled a packaged sandwich consisting of a frankfurter and a bun, a heating station to which such impaled sandwiches may be successively presented, electrical circuitry including contacts at said broiling station for engagement with the pronged electrodes for closing the circuit through the frankfurter, electro-operable means adjacent the broiling station for discharging the packaged sandwich from the pronged electrodes, switches for controlling the operation of the discharging means and the rotation of the motor and a timer device; said timer device when operated functioning to control the time interval during which the sandwich will be subjected to heating and then control successively the switches for the operation of the discharging means and the motor to advance the conveyor to present a succeeding sandwich to the broiling station.

6. A machine according to claim 5 wherein the pairs of spaced pronged electrodes extend outwardly from the orbit of travel of the conveyor and the discharging means comprises a lever having a part normally disposed at the broiling station between an impaled sandwich and the orbit of the conveyor and being of a width to engage between the pairs of pronged electrodes.

References Cited in the file of this patent
UNITED STATES PATENTS

| | | |
|---|---|---|
| 1,716,266 | Flamm | June 4, 1929 |
| 1,961,681 | Bohart | June 5, 1934 |
| 2,139,690 | McConnell et al. | Dec. 13, 1938 |
| 2,182,383 | Lang et al. | Dec. 5, 1939 |
| 2,238,698 | Knaust | Apr. 15, 1941 |
| 2,256,976 | Ford | Sept. 23, 1941 |
| 2,287,956 | Aff | June 30, 1942 |
| 2,794,384 | Sierk et al. | June 4, 1957 |